Oct. 14, 1958  J. E. WHIPPLE  2,856,076
FIBER DISC FILTER CARTRIDGES
Filed March 30, 1956  2 Sheets-Sheet 1

INVENTOR.
JOHN E. WHIPPLE
BY
Charles B. Wilson
ATTORNEY

United States Patent Office 2,856,076
Patented Oct. 14, 1958

2,856,076

FIBER DISC FILTER CARTRIDGES

John E. Whipple, Rumford, R. I., assignor to Fram Corporation, Providence, R. I., a corporation of Rhode Island Application March 30, 1956, Serial No. 575,140

1 Claim. (Cl. 210—352)

This invention relates to filter cartridges formed of a stack of filter discs, and more particularly, to large oil filter cartridges formed of fiber discs and wherein substantial shrinkage of the stack of discs is likely to occur in use.

More specifically, the present invention relates to replaceable cartridges of the filter disc type used in large oil filters, such as are employed to filter the lubricating oil for diesel engines as used for railroad and industrial motor power. These oil filter cartridges are frequently more than two feet long and it is found that the stack of fiber discs used in such cartridges may shrink from one to several inches in use under the heat and pressure of the engine oil being filtered.

The primary object of the present invention is to provide a fiber disc type of filter cartridge of simple construction, and which is adapted to be used in the various models of filters now employed on diesel engines, when such engines are used as stationary and railroad engines. Such cartridge comprises a complete unit ready for use in different types of filter casings, and does not require a separate adaptor to be supplied to enable the cartridge to be employed in the filter casings.

Filters such as above referred to, and now employed to filter the lubricating oil for diesel engines, are in extensive use, and comprise a liquid-tight metal casing that contains one center tube where a single filter cartridge is used, and several center tubes if several cartridges are to be used in the filter shell. Such center tube or center tubes, usually range from 27 to 31 inches in length, depending upon the make of the filter shell. The cartridge of the present invention is designed to be used on these different length center tubes, since the length of the present cartridge does not need to conform accurately to the length of the center tube. This makes it practical to use one standard length of cartridge on different length center tubes. If the center tube is considerably shorter in length than the 27 inches just mentioned, it is a simple matter to reduce the overall length of the cartridge by removing some of the filter discs and forcing down the top plate at the upper end of the cartridge, and thereby reduce the overall length of the cartridge.

The filter cartridge of the present invention is also adapted for use upon center tubes that are smaller in diameter throughout the center portion of the tube than at either end thereof, as is the case in one well-known type of oil filter now on the market. To meet this condition, the backing plate at the upper end of the cartridge of the present invention is provided with a central sealing sleeve which is supported by this backing plate to fit over the center tube, and upon this sleeve is mounted for sliding movement a top plate that sealingly engages such sleeve. The arrangement is such that as shrinkage of the stack of filter discs occurs, the top plate can move downwardly with such shrinkage under the force of a compressed spring while it maintains its sealing engagement with the central sleeve. As a result of this construction, the stack of filter discs may shrink from one to several inches and still operate properly.

The above and other features of the present invention will be further understood from the following description when read in connection with the accompanying drawings, wherein.

Figure 1:
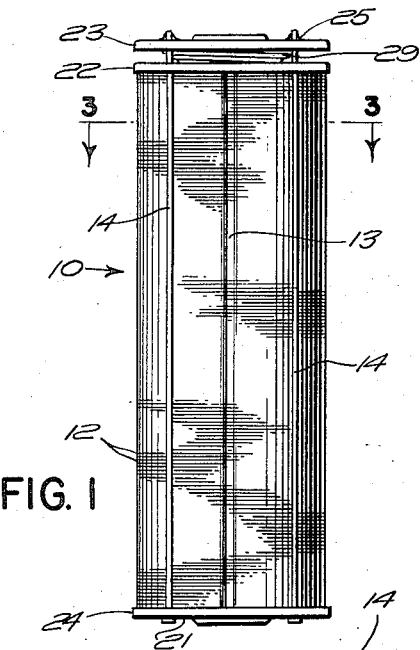
Fig. 1 is a side elevation of a filter cartridge constructed in accordance with the present invention.
Figure 2:
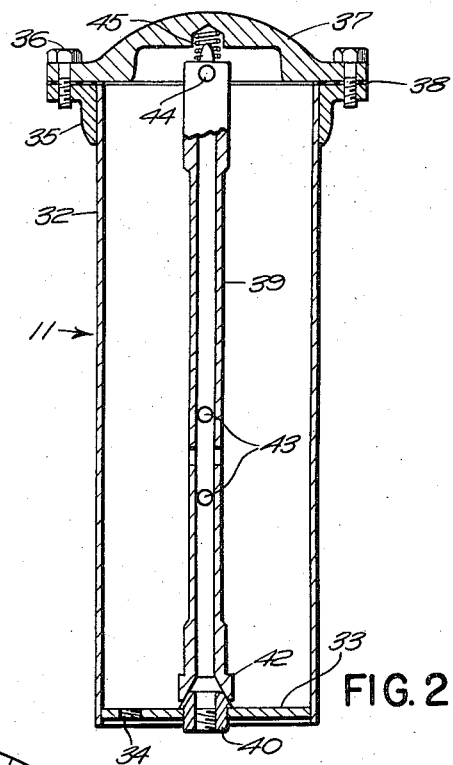
Fig. 2 is a vertical sectional view through a filter casing, or shell, of a type in which the cartridge of Fig. 1 may be used.
Figure 3:
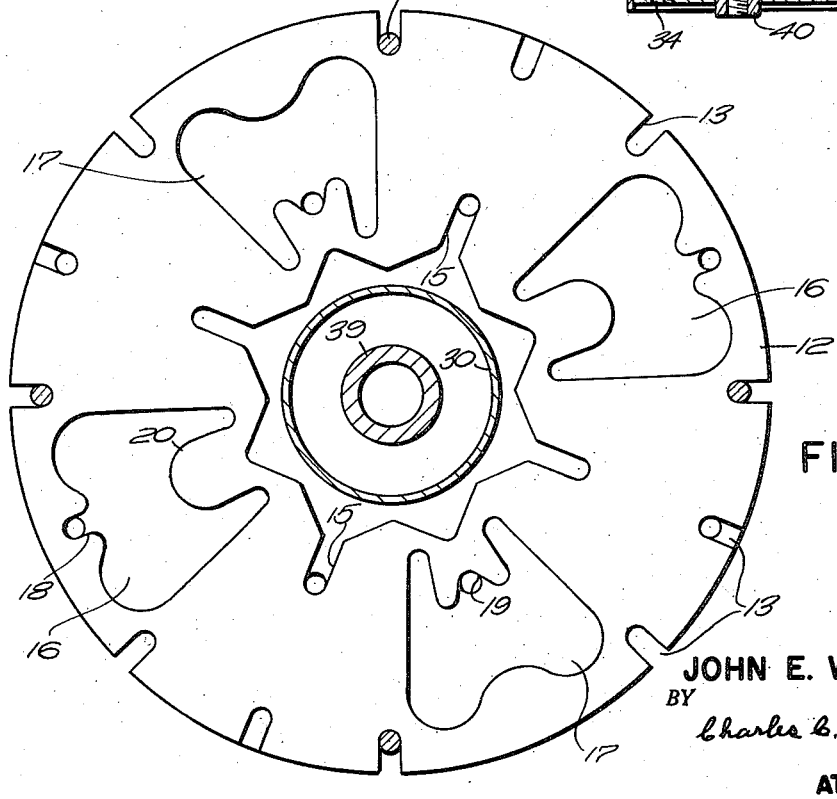
Figure 4:
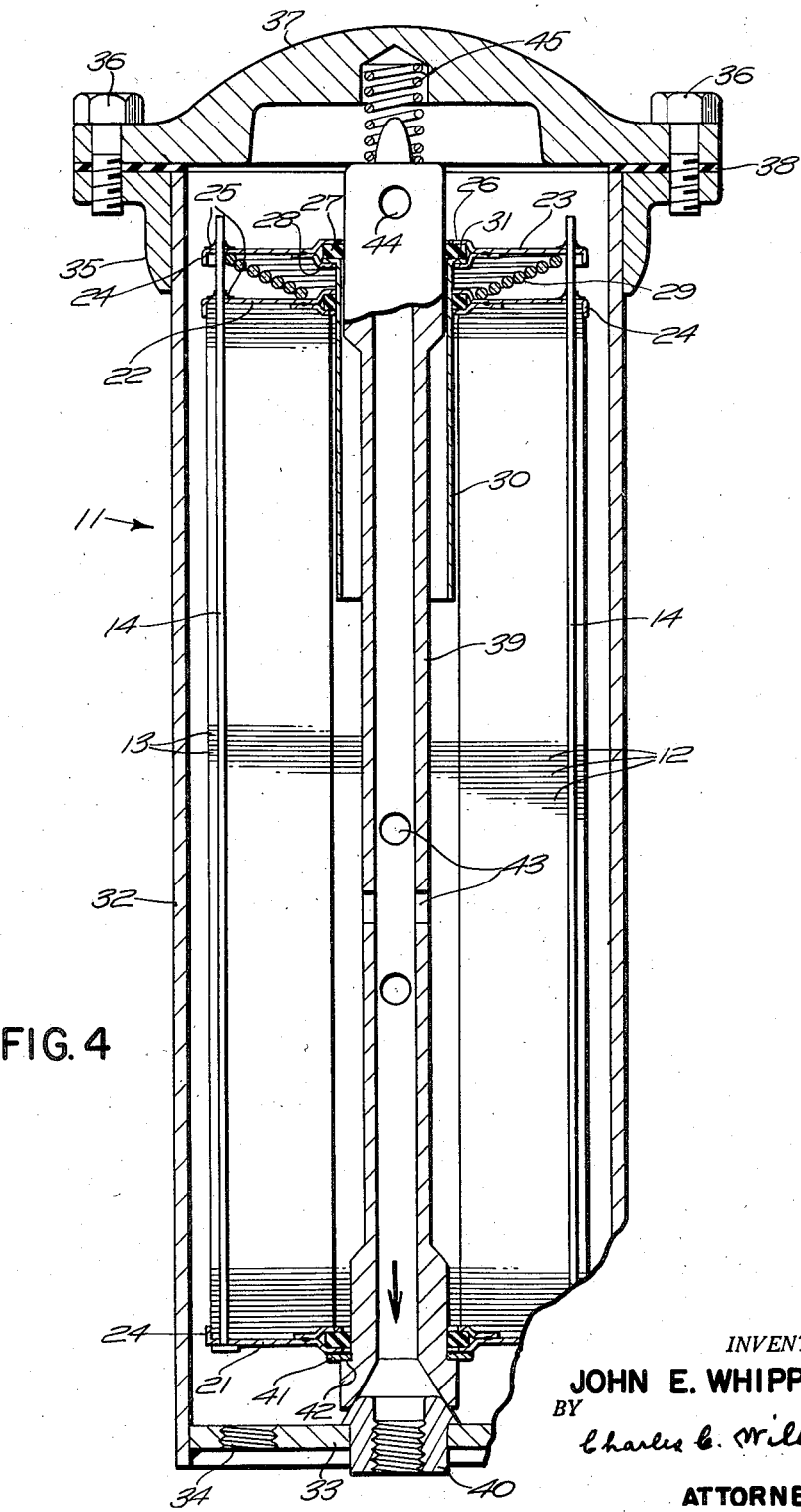

Fig. 3 on a larger scale is a sectional view taken on the line 3—3 of Fig. 1; and Fig. 4 is a vertical sectional view through the cartridge of Fig. 1 and shell of Fig. 2 and shows the cartridge in its operating position in the shell.

Referring to the drawings, the numeral 10 designates in its entirety, the filter cartridge forming the subject matter of the present invention. The numeral 11 designates in its entirety, a filter casing or shell, of the general construction now in extensive use upon diesel engines, and which shell has been provided heretofore with different types of filter cartridges to filter the lubricating oil supplied to diesel engines.

The filter cartridge 10 is formed primarily of a stack of fiber or paper filter discs 12, all of which discs may be identical in construction, and may be cut in various ways to effect the desired oil filtering operation. It is desired to point out that the particular manner in which these discs are cut and assembled, forms no essential part of the present invention. It is desired to mention that the diesel engine filters now in use are commonly of the full-flow type in which the oil flow is in an outside-in direction. Therefore, in the cartridge 10 the discs 12 are preferably cut as shown in Fig. 3, and are provided with a number of notches 13 formed in the outer periphery thereof in equally spaced relation to each other. One of the purposes of these notches is to receive the vertical tie-rods 14, four being shown in Fig. 3 of the drawing. These rods serve to hold the stack of filter discs in the proper assembled condition as shown in Figs. 1 and 4. The filter cartridge 10 is, as above stated, of the full-flow type so that the entire amount of oil supplied to the engine's bearings may pass through this cartridge on its way to the bearings. The construction shown is such that the oil need pass through only one thickness of filter paper in traveling through the cartridge. This result is secured by assembling the filter discs, so that the oil to be filtered can enter the stack of discs through the notches 13 formed in the outer periphery of such discs, and can reach the central opening formed in each disc by flowing into such opening through the notches 15 which are disposed around this central opening. Each disc 12 is provided with two cut-away areas 16 and two cut-away areas 17 disposed between the inner and outer periphery of the discs. It will be noted that the cut-away area 16 differs from the cut-away area 17, in that each area 16 has a notch 18 disposed adjacent the outer periphery of the disc, whereas, the area 17 does not have this notch. Each area 17 has a notch 19 disposed near the central opening of such disc. It will also be noted that each area 16 has a relatively large projection 20 extending into such area, and each area 17 has a projection extending into its area, and in which the notch 19 is formed. The arrangement is such that when the discs are cut as shown in Fig. 3, and are rotated one relatively to the other through a small angle as they are assembled to form the stack, the oil to be filtered can enter through the outer notches 13 to enter the cut-away area 16 which serves to provide a space in which the dirt in the oil may accumulate, and the oil upon entering this area may pass up or down through the thickness of one disc, to enter a cut-away area 17, of an adjacent disc, from which the oil can reach the central opening of the stack by flowing through the radial notch 15. The particular manner in which these discs are cut-away or assembled is not essential to the present invention, but the above construction has been described to make clear how the oil, by passing through a single thickness of filter paper, may find its way from the exterior to the interior of the filter cartridge designated by 10.

The construction of the discs is such that when oil enters a cutout space 16 as above described, the only way it can leave such space is to penetrate through the upper and lower paper discs covering this space. This will allow the oil thus filtered to enter the cutout space 17 of an adjacent disc and find its way into the notch 19 which overlies a deep notch 15. As soon as the oil enters a notch 19 it can reach the center area of the cartridge.

The stack of discs 12 just described, may rest upon a bottom plate 21, and at the top of the stack of discs is provided a top plate 22. Above the top plate 22 is disposed a backing plate 23. These three plates preferably have the same construction so that they are interchangeable for ease of assembly. Each of these plates has a laterally extending outer flange 24, and each plate has four holes formed therethrough to receive the tie-rods 14. These tie-rods serve to hold the plates 21 and 22 in tight engagement with the opposite ends of the stack of discs 12 and the backing plate 23, disposed a short distance above the top plate 22, engages the upper end portions of the tie-rods 14 as shown and is held upon such rods by the one-way locking members 25. Each of the plates just mentioned has a central opening adapted to surround a center tube, and is provided adjacent said opening with an annular offset portion 26 adapted to receive a gasket 27 of oil-resistant rubber, such as neoprene. These gaskets 27 are retained in the position shown by providing each plate with a sealing ring 28 which is spot-welded to the plate as shown.

As above pointed out, a long filter cartridge, such as herein shown, and over two feet in length, may shrink anywhere from one to several inches in use due to the high external pressure of the hot oil upon the cartridge. It is important that as such shrinkage occurs, the top plate 22 be retained in sealing engagement with the uppermost fiber disc, to thereby prevent oil from entering the interior of the cartridge without being filtered. To meet this condition, a strong coiled spring 29 is confined between the top plate 22 and the backing plate 23, and since the backing plate is held in a fixed position by tie-rods 14, the pressure of the spring 29 will serve to force the top plate downwardly as shrinkage of the stack occurs. This spring 29 is conveniently retained in place by making its outside diameter of a size that will contact the four surrounding tie-rods as shown, and the smallest coil of this ring is preferably of a size to embrace the offset portion 26 of the top plate as shown. This serves to prevent the spring from becoming displaced in use. When the filter cartridge just described is manufactured, the top plate 22 is pressed down hard upon the stack of filter discs and is held in this position by one-way locking members 25, and the backing plate 23 is forced downwardly under predetermined pressure to compress the coiled spring 29 and is held in this spring compressing position by the tie-rods 14 and locking members 25 as shown.

One of the features of the present invention resides in the construction whereby the backing plate 23 is provided with a central sealing sleeve 30 which is supported by this backing plate to extend downwardly within the filter cartridge as shown. This sleeve is preferably provided at its upper end with an outwardly extending annular flange 31 which rests upon the sealing ring 28 and is confined between such ring and the adjacent gasket 27. This sealing sleeve is of a size to surround the center tube of the filter and serves to provide a liquid-tight seal between the top plate 22 and such sleeve, and to maintain such tight seal even if the top plate moves downwardly along this sleeve several inches as the cartridge shrinks. The sleeve 30 therefore extends downwardly inside of the cartridge a distance greater than the maximum shrinkage contemplated for the stack of discs.

Having described a filter cartridge constructed in accordance with the present invention, a filter casing or shell such as indicated in its entirety by the numeral 11, and which represents one of several filter shells that are in use, will now be described.

The casing or shell 11 which is cylindrical in shape has the outer cylindrical wall 32 and this casing is closed at its lower end by the end wall 33 which may be welded inside of the wall 32 as shown. This end wall has an oil inlet opening 34. Adjacent the upper end of the cylindrical wall 32 is provided an annular casting 35 which is welded to the upper end of the tube wall, and this annular casting is adapted to have removably secured thereto by the bolts 36 the cover plate 37, a sealing gasket 38 is provided between the cover plate 37 and ring 35 to which the cover is bolted. The casing 11 in the construction shown is provided with a removable center tube 39, and the lower end portion of this tube is shown as having an annular tapered bearing adapted to sealingly engage the similarly shaped upper end of the sleeve 40 which is ridgedly secured in a central opening formed in the base plate 33. This sleeve serves as an oil outlet for the filter shell. The center tube 39 as shown, is of smaller diameter throughout the central portion of its length than at the opposite ends thereof. The center tube is so shown because this is the construction of the center tube used in one well-known type of filter shell now on the market. The filter cartridge of the present invention is so designed that it may be employed upon this type of center tube, as well as on center tubes that are of uniform diameter throughout their length. Fortunately, the center tubes found on the market in the different types of large oil filters for filtering the oil of diesel engines, usually have a diameter of 1¾" near the ends thereof. Therefore, since the filter cartridge as above described is provided with the plates 21, 22 and 23, each having a similar sealing gasket 27, these gaskets will sealingly engage the various center tubes found on the market, and will also sealingly engage the above described sealing sleeve 30, the diameter of which is only slightly larger than the tube 39.

It will therefore be seen that the construction of the filter cartridge 10 is such that it is easy to service the various types of filter casings or shells 11 now found on the market, since all that is necessary is to remove the top plate 37 and force a filter cartridge 10 downwardly onto the center tube 39 until the bottom plate 21 rests upon supporting means such as a metal ring 41 that is seated on a shoulder 42 disposed near the lower end of the center tube. As the cartridge is forced downwardly along the center tube, the gasket of the bottom plate 21 will snugly embrace the lower portion of the center tube to form a seal therewith, and the backing plate 23 will likewise snugly embrace the upper portion of the center tube to form an oil seal therewith. Also, as above stated, the gasket for the top plate 22 will sealingly engage the center sleeve 30. As a result of this construction, oil cannot leak around either end of the cartridge to find its way into the center of the cartridge without being subjected to the desired filtering operation, even when substantial shrinkage of the cartridge occurs.

After the oil has filtered through the cartridge in an outside-in direction to reach the center tube, it can enter the interior of this tube through the holes 43 to pass downwardly in the center tube and out through the sleeve 40 as indicated by the arrow. Should the filter cartridge just described become clogged through long use without being replaced, and as a result causes the pressure within the filter 11 to become abnormally high, the oil can by-pass the cartridge by entering the center tube through the inlet holes 44 near the upper end of this tube and force its way past a relief valve, not shown, but disposed within this center tube. The lower end of this center tube is held seated in sealing engagement with the upper end of the sleeve 40 by the downward pressure of a coiled spring 45 which is confined between a shouldered upper portion of the center tube and a recess in the cover 37 as shown.

Due to the construction above described, whereby each of the plates 21, 22 and 23 is provided with a gasket 27 which sealingly engages the center tube or the central sleeve 30, the overall length of the cartridge 10 does not need to conform accurately to the overall length of the center tube. As a result, it is feasible to supply cartridges of a standard overall length which can be used in filter casings that may vary several inches in length. If it should be desired to install the present cartridge in a filter shell which is considerably shorter in length than that for which the cartridge was designed, all that is necessary is to remove from the upper end of the cartridge a number of the discs 12 and then force the plates 22 and 23 downwardly until they exert the desired pressure upon the stack of discs. These plates will be retained in this position by the tie-rods 14, and if the upper ends of the tie-rods now protrude a substantial distance above the backing plate, they can be easily cut off.

It will be seen from the foregoing that the construction of the filter cartridge contemplated by the present invention is very simple in that it consists primarily of a large number of identical filter discs 12, four tie-rods 14 and three identical plates 21, 22 and 23 which are used as bottom plate, top plate and backing plate. The only other elements of importance in the present cartridge are the pressure spring 29 and central sealing sleeve 30, which sleeve enables the present cartridge to be employed in filter casings provided with different types of center tubes.

Having thus described my invention, what I claim and desire to protect by Letters Patent is:

A long filter cartridge of the outside-in-flow type for a filter casing having a center tube, and having a filter construction that may shrink a substantial amount in use; comprising a stack of fibrous filter discs having their centers removed to provide an opening in the stack to receive a center tube, a bottom plate and top plate for the stack, tie-rods extending lengthwise of the stack and connecting said plates, a backing plate anchored to the tie-rods above the top plate and constructed to sealingly embrace the center tube, a coiled spring confined between the top plate and backing plate to maintain a downward pressure on the top plate and discs, a sleeve sealingly secured to the backing plate to extend downwardly therefrom about the center tube and said top plate being slidably mounted on the sleeve and sealingly embracing the same, whereby oil in the filter casing cannot pass this top plate to enter the center tube even if the stack shrinks an inch or more.

References Cited in the file of this patent

UNITED STATES PATENTS

| | | |
|---|---|---|
| 2,330,945 | Becker | Oct. 5, 1943 |
| 2,457,122 | Burley | Dec. 28, 1948 |
| 2,687,805 | Proulx | Aug. 31, 1954 |
| 2,692,686 | Fleck et al. | Oct. 26, 1954 |

FOREIGN PATENTS

| | | |
|---|---|---|
| 825,537 | Germany | July 8, 1949 |